United States Patent [19]

Tassin

[11] Patent Number: 4,624,497
[45] Date of Patent: Nov. 25, 1986

[54] TRUCK AIR DEFLECTOR

[76] Inventor: Robert L. Tassin, 3305 Cherry La. #13, Fargo, N. Dak. 58102

[21] Appl. No.: 745,606

[22] Filed: Jun. 17, 1985

[51] Int. Cl.⁴ .............................................. B62D 35/00
[52] U.S. Cl. .................................................... 296/1 S
[58] Field of Search .................. 296/1 S, 91; 105/2 R

[56] References Cited

U.S. PATENT DOCUMENTS

| | | | |
|---|---|---|---|
| 3,762,758 | 10/1973 | Wilkerson | 296/1 S |
| 3,797,879 | 3/1974 | Edwards | 296/1 S |
| 3,934,923 | 1/1976 | Lissaman et al. | 296/1 S |
| 3,977,716 | 8/1976 | Whited | 296/1 S |
| 3,999,796 | 12/1976 | Greene, Sr. et al. | 296/1 S |
| 4,022,508 | 5/1977 | Kirsch et al. | 105/2 R X |
| 4,057,280 | 11/1977 | MacCready, Jr. et al. | 296/1 S |
| 4,103,957 | 8/1978 | Landry et al. | 296/1 S |
| 4,116,482 | 9/1978 | Spiegel | 296/1 S |
| 4,131,309 | 12/1978 | Henke | 296/1 S |
| 4,214,786 | 7/1980 | Morrison | 296/1 S |
| 4,313,635 | 2/1982 | Front | 296/1 S |

FOREIGN PATENT DOCUMENTS 2366978  6/1978  France ...................... 296/1 S

Primary Examiner—Randolph A. Reese
Assistant Examiner—Russell D. Stormer
Attorney, Agent, or Firm—Robert E. Kleve

[57] ABSTRACT

The invention comprises an air deflection apparatus for a truck of the cab-over engine type of construction having a dual pair of flanges adapted to be mounted to the front face of the truck with the flanges at an acute projecting angle on each side of the radiator on the front face of the truck so that the flanges provide a tapered surface on the front face to deflect air off at an angle to the side of the truck. The tapered surfaces provide less resistance to the flow of air against and past the truck during forward movement of the truck than there would be with the conventional front face of such a truck which is perpendicular to the air flow and this thereby increases the efficiency and mileage of the truck by the reduced power required because of there being less air resistance to the truck movement.

3 Claims, 11 Drawing Figures

TRUCK AIR DEFLECTOR

This invention relates to an air deflection apparatus for the front face of a truck.

It is an object of the invention to provide a novel air deflection apparatus having a pair of flanges adapted to be positioned at an acute angle along the front face of a cab-over engine type truck to deflect the air so that the truck meets less air resistance to the air as it moves forward for improving the air flow past the truck to thereby improve the truck's mileage.

It is another object of the invention to provide a novel flange construction along the front face of a cab-over engine type truck to deflect the air as it engages the truck as it moves forward, in a manner to provide less air resistance than the conventional perpendicular front face of such a truck for improving the air flow past the truck.

It is another object of the invention to provide a novel air deflection apparatus for mounting to the front face of a conventional truck that is collapsible against the front face when not in use and which is extendable for operation to deflect the air so that the truck meets less air resistance as it moves forward to thereby improve its mileage efficiency.

It is a further object of the invention to provide a novel flange air deflection construction for the front face of a truck.

Further objects and advantages of the invention will become apparent as the description proceeds and when taken in conjunction with the accompanying drawing wherein.

Briefly stated, the invention comprises an air deflection apparatus for attachment to the conventional flat front face of a cab-over engine type truck. The apparatus has a dual pair of flanges which are adapted to be mounted to the front face of the truck on each side of the radiator grill, and which can be extended to project at an acute angle to the front face of the truck to deflect air in front of the truck to the side of the truck with less air resistance to the forward movement of the truck than occurs with the air engaging the flat front face of the truck in its unmodified configuration. This reduces power requirements for moving the truck thereby improving its fuel efficiency.

Figure 1:
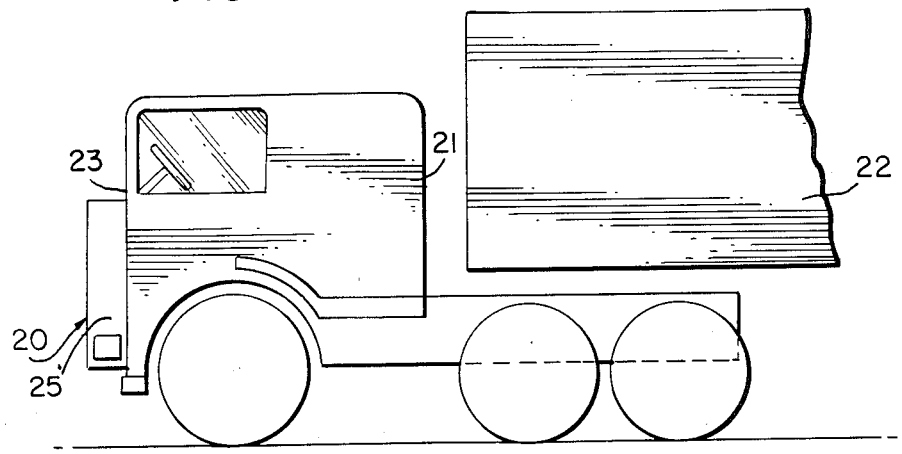
FIG. 1 is a side elevational view of the air deflection apparatus shown mounted to the front face of a cab-over engine type truck.
Figure 2:
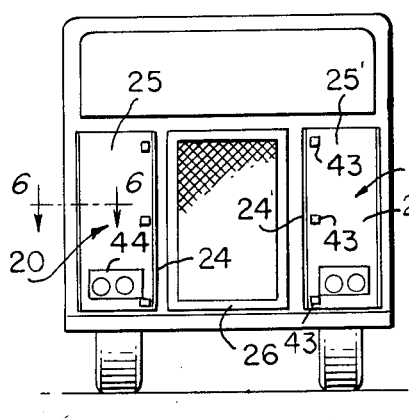
FIG. 2 is a front elevational view of the air deflection apparatus shown mounted to the front face of a cab-over engine type truck.
Figure 3:
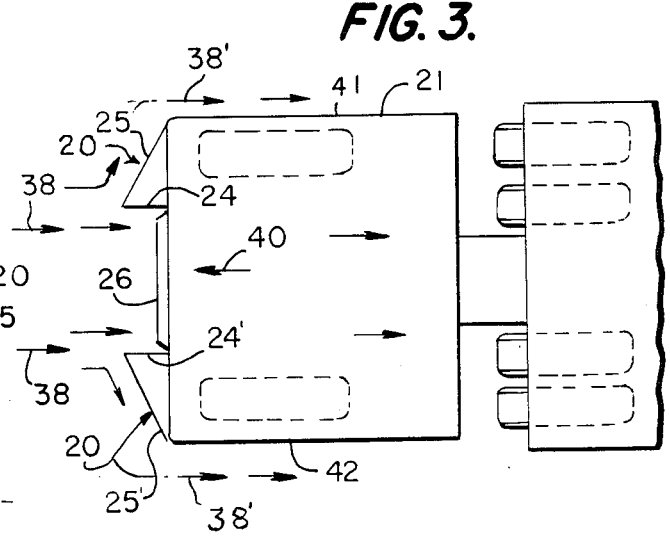
FIG. 3 is a top plan view of the air deflection apparatus shown operatively attached to the front face of the truck with the flanges extended for operative use.

Referring more particularly to the drawings, in FIGS. 1 through 3, the air deflection apparatus 20 is shown operatively mounted to a truck 21 having a conventional cab-over engine construction. The truck 21 has a conventional trailer 22 attached to the rear and the truck has a conventional flat front face 23. The apparatus has a dual pair of flanges 24 and 25 and 24' and 25' which are mounted on each side of a radiator grill 26. Behind the radiator grill 26 is a conventional air passageway with the truck engine in the passageway and an air opening is provided in the back of the truck cab whereby air may pass through the radiator grill and radiator over the engine in the passageway and out the opening in the back of the truck cab. The flange 24 with respect to flange 25 and flange 24' with respect to flange 25' project forward from the front face of the truck at an acute angle to one another on each side of the radiator grill when the flanges have been extended to their operative position as illustrated in FIGS. 1, 2, 3, 4, 5, 6, and 8 in solid lines.

The flanges 24 and 25 and 24' and 25' are pivotally connected together each by three hinges 29. The flanges 25 and 25' are pivotally mounted to the front face 23 of the truck each by two hinges 29'.

Three clamps 30 are attached to the front face 23 of the truck on one side of the radiator grill and three clamps 30' are attached to the front face on the other side of the grill. The flanges 24 and 24' when in their extended projected position, as illustrated in FIGS. 1, 2, 3, 4, 5, 6, and 8, have their one edge 32 attached between the parallel plates 33 and 33' of the clamps 30 and 30', and are held in this position by bolts 34, which extend through the plates 33 and 33' and through bores in the edge 32 of the flanges 24 and 24' and are threaded into threaded nuts 35. The threaded nuts 35 are fixed to the plates 33' and the plates 33 and 33' have bores to allow the bolts 34 to pass freely through the plates 33 and 33' to be threaded into the nuts 35.

The clamps 30 and 30' are fixed to the front face 23 of the truck by bolts 36. The hinges 29 and 29' each have a pair of plates 29" and 29"', which are pivotally connected together by a pin 29"". The plates 29" and plates 29"' of the hinges 29 are fixed to the flanges 24 and 25, respectively, by screws 37, and the plates 29" and 29"' of similar hinges 29' are fixed to the flanges 25 and front face 23 by screws 37' respectively.

Operation

When the apparatus has been attached to the front face of a truck as illustrated, with the flanges 24 and 25 and 24' and 25' extended as illustrated in FIGS. 1, 2, 3, 4, 5, 6, and 8, the flanges 25 and 25' provide an angular or tapered surface with respect to the airstream 38 that engage the flanges as the truck moves forward in the direction of the arrow 40. The airstream 38 engages the flanges 25 and 25', which are at an angle with respect to the airstream 38, as the truck moves forward and the flanges thereby deflect a part 38' of the airstream 38 to each side 41 and 42 of the truck with less air resistance to the forward movement of the truck than would be the situation if the airstream 38 were to engage the front face 23 of the truck, which is substantially perpendicular to the direction of the airstream movement 38 against the truck caused by the truck moving forward. Thus there being less air resistance to the truck moving forward, the truck can be operated with less power requirements for the same task than would be required if the air deflection apparatus were not attached to the truck; and since less power requirements are needed for the same task, improved fuel efficiency can be obtained with the apparatus when in its extended operative position, when the truck is driven forward.

Figure 4:
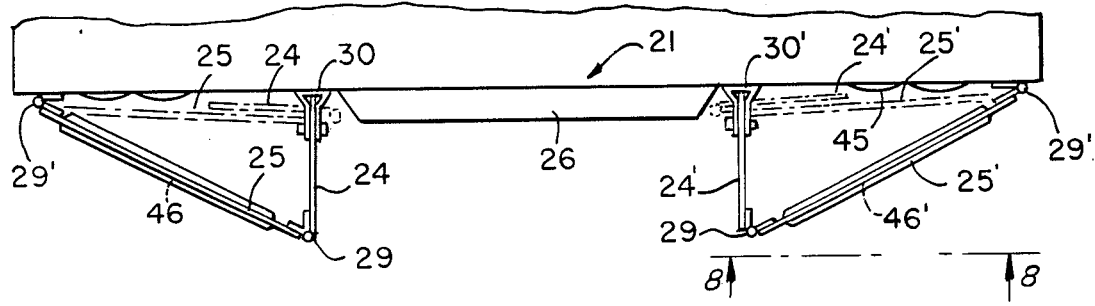
FIG. 4 is an enlarged fragmentary top view of the air deflection apparatus with the flanges in their extended operative position on the truck in solid lines.
Figure 5:
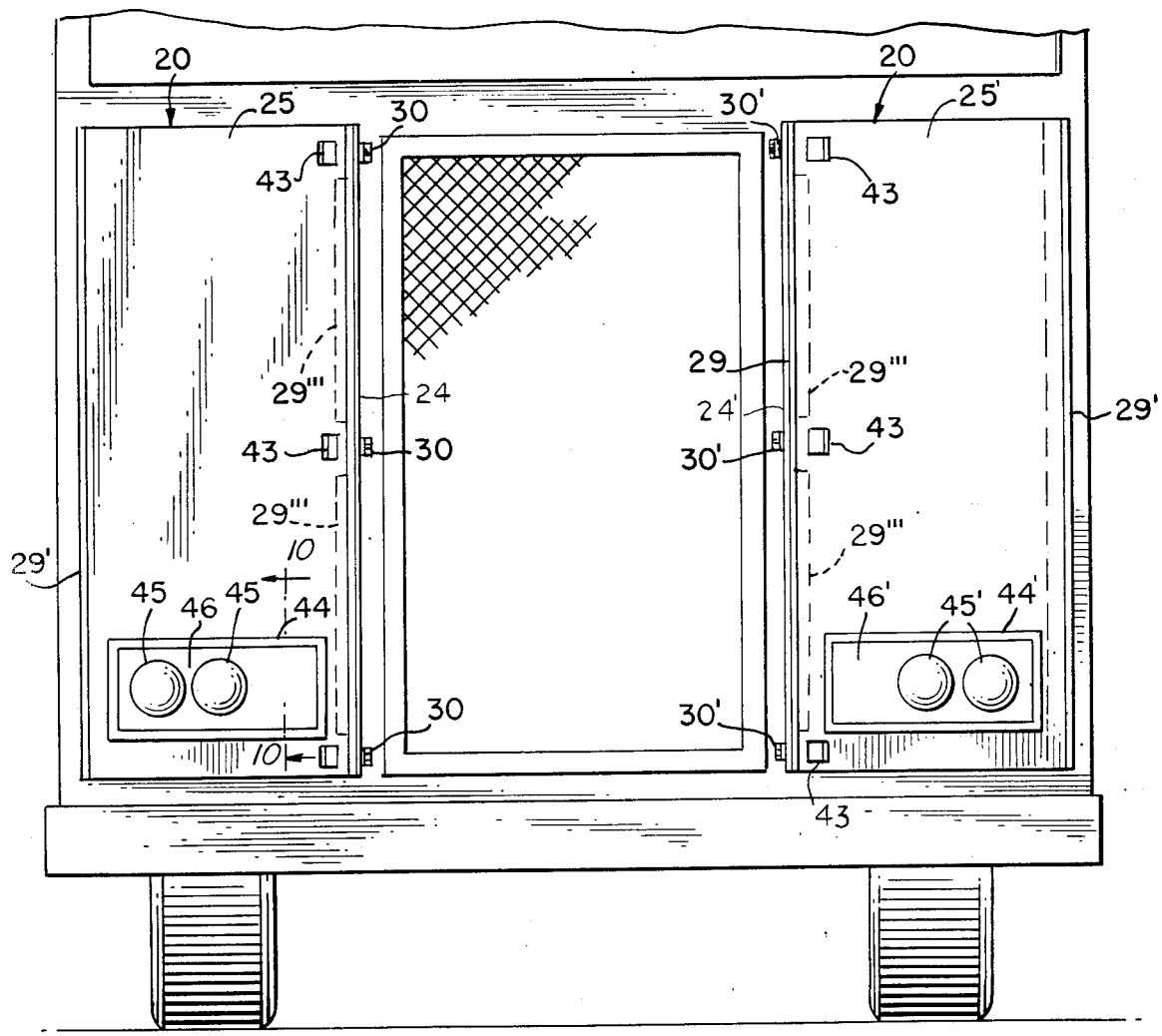
FIG. 5 is an enlarged front elevational view of the air deflection apparatus with the flanges in their extended operative position on the truck.
Figure 6:
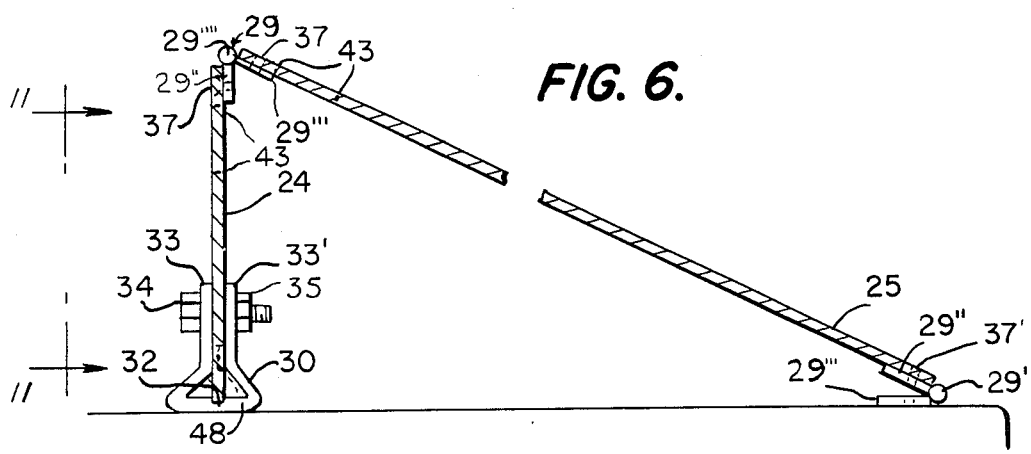
FIG. 6 is an enlarged cross sectional view of one pair of the dual flanges shown attached to the truck and in its extended operative position taken along line 6—6 of FIG. 2.
Figure 8:
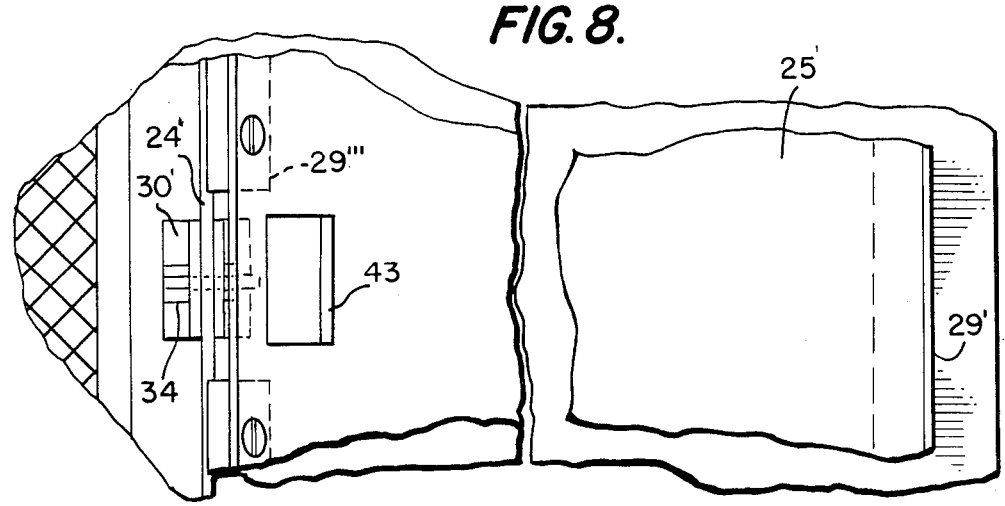
FIG. 8 is an enlarged front fragmentary view of the intermediate portion of one of the pair of flanges in their extended position taken along line 8—8 of FIG. 4.
Figure 7:
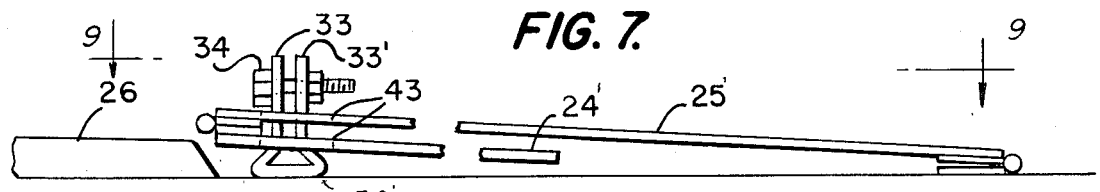
FIG. 7 is an enlarged cross sectional view similar to FIG. 6 illustrating one pair of the dual flanges attached to the truck and in its collapsed position.
Figure 9:
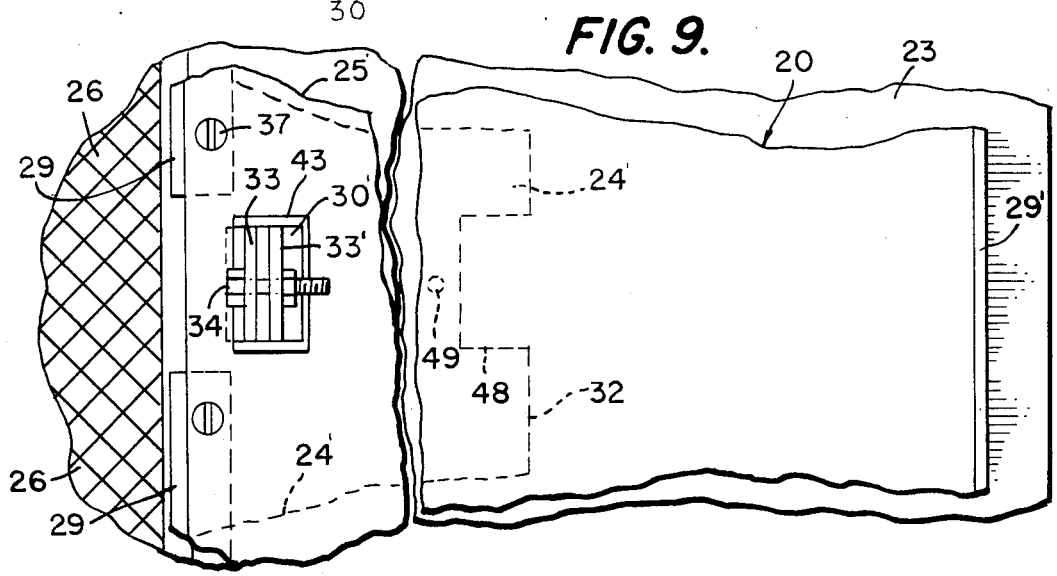
FIG. 9 is a fragmentary cross sectional view taken along line 9—9 of FIG. 7.

The flanges 24 and 25 and 24' and 25' may be pivoted from their projecting position illustrated in FIGS. 1, 2, 3, and 4 in solid lines to their substantially flush position as illustrated in dashed lines in FIG. 4 and solid lines in FIGS. 7 and 9, by removing the bolts 34 from the clamps 30 and 30', sliding the flanges 24 and 24' out of the plates 33 and 33' of the clamps, by pivoting the flanges 25 and 25' further away from the front face of the truck. The plates 24 and 24' will then be pivoted flush against plates 25 and 25' respectively, and the plates 24 and 25, with plate 24 flush against plate 25, will be pivoted together back toward the front face 23 to their position illustrated in solid lines in FIGS. 7 and 9, by the clamps 30 passing through openings 43 in flanges 24 and 25. The bolts 34 will then be reattached to the clamps with the flanges in this position, by inserting the bolts 34 through the bores in the plates 33 and 33' and threading them into the nuts 35 of the clamps. The bolts will thereby hold and lock the plates 24 and 25 in their flush position against the face 23 as illustrated in FIGS. 7 and 9. Similarly plates 24' and 25' having openings 43 and the plates 24' and 25' will be pivoted from their projecting position to their flush position illustrated in FIGS. 7 and 9 in a similar manner and held in this substantially flush position by reinserting the bolts 34 into the clamps 30'. The flanges 24 and 25 and 24' and 25' will be positioned in their substantially flush position against the face 23, when the flanges are not in use.

Thus it will be seen that a novel air deflection device or apparatus has been provided that has flanges that can be positioned in a projecting position for deflecting air encountering the front face of a conventional cab-over engine type truck at an angle past the front face as the truck moves forward. The flanges, by deflecting the air at an angle so that the air offers less resistance to the forward movement of the truck, thereby makes it easier to move the truck forward than if the front face of the truck were to encounter the air in its conventional substantially perpendicular configuration. Making it easier to move the truck forward increases the fuel efficiency of the truck. Further, it provides an apparatus which can be folded back from its projected position if it is desired not to use the apparatus or if it is desired to shorten the length of the truck for compliance with some regulation or to accomplish a docking maneuver in a limited space.

At the bottom of the flanges 25 and 25' are rectangular cut-outs 44 and 44'. The cut-outs provide an opening for the headlights 45 and 45' on each side of the truck so that the light from these headlights can project forward without interference. A pair of clear plastic panels 46 and 46' are provided which are mounted in the cut-outs by rubber strips to cover the area of the cut-outs to provide an uninterrupted deflecting surface while allowing the headlight beam to pass through and illuminate the road.

Although the apparatus is illustrated with flanges 24 and 25 and 24' and 25' being pivotable to a flush position as the preferred form of the invention, it is also contemplated that these flanges 24 and 25 and 24' and 25', can be permanently fixed in their projected position by mounting these flanges rigidly in this extended position.

Figure 11:
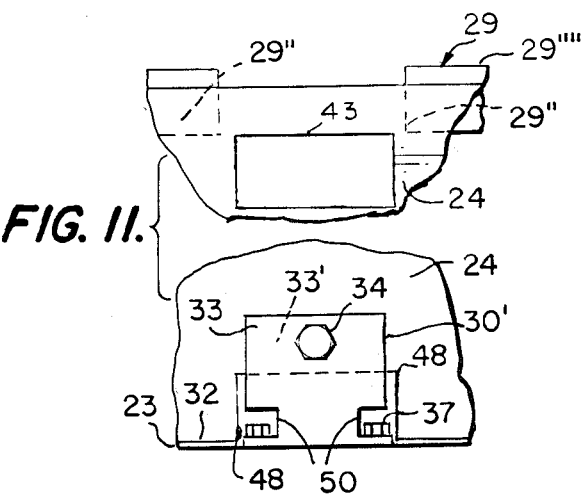
FIG. 11 is a view along line 11—11 of FIG. 6 in front of one of the clamps.
Figure 10:
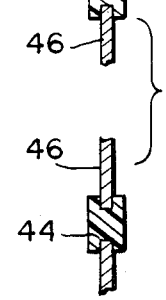
FIG. 10 is a cross sectional view along line 10—10 of FIG. 5 and parallel to the tapered surface of the flange apparatus.

The flanges 24 and 24' each have notches 48 at their lower edges 32 for each clamp 30 and 30' as illustrated in FIG. 11, so that the flanges 24 and 24' may be pivoted in and out between the plates 33 and 33', when changing the flanges to their projected positions and visa versa, without the plates having to flex as far apart. The clamps including the plate portions 33 and 33' are to be made of spring steel or of sufficiently resilient material to flex apart an adequate distance to allow the flanges 24 and 24' to be removed and attached between the plates 33 and 33' easily. The flanges 24 and 24' each will have bores 49 adjacent each notch for each clamp 30 and 30' to allow the bolts 34 to pass through the flanges when attaching the flanges 24 and 25 and 24' and 25' in their projected positions. The clamps 30 and 30' may be made smaller than illustrated in relation to the flanges 24 and 25 and 24' and 25' for easier operation. The clamps 30 and 30' also may have notched out areas 50 to allow easier access to the bolts 36 to attach the bolts when attaching the clamps to the truck face 23. Also, the clamps will be formed so that the normal position of plate 33' with respect to plate 33, is spaced further away from plate 33. The bore through plate 33 will be smooth and slightly oversized, with respect to bolt 34, that receives the bolt 34, so that the tightening of the bolt 34 in the nut 35 will then draw plate 33' toward plate 33 until plate 33' is in its position shown in solid lines. This allows additional room for insertion and removal of flanges 24 and 24'as plate 33' will return to its position further away when the bolt 34 is removed. The clamps are all of similar construction and operation.

The angle formed between plates 24 and 24 and 24' and 25' may vary, and may depend on the particular dimensions of the truck.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein

What is claimed is:

1. An air deflection apparatus comprising a truck having a substantially flat vertical front face portion with a radiator grill mounted centrally in the front face portion, a pair of air deflection panel means mounted on said front face portion on each side of said radiator grill, said pair of panel means each comprising a pair of elongated panels pivotally mounted along one of their longitudinal edges to one another, one of said panels being pivotally mounted along its other longitudinal edge and the other panel being detachably mounted along its other longitudinal edge along vertical axes to said front face portion of said truck, said pair of panels of each panel means being movable on their mounting to an extended position with the pair of panels pointed forward to form separate vertical ridges where the panels are mounted together and with the panels diverging away from one another rearwardly and with the other panel along its rearward other edge detachably mounted to the front face and with at least one of said panels diverging rearwardly at an angle to the front face and laterally outward to act to deflect air traveling rearwardly toward the truck off at an angle toward a lateral side of said truck to reduce air resistance against the forward motion of the truck, the other of said panels on each respective side of the grill having its detachable mounting adjacent their respective outer side edge of the grill with each of the panels diverging rearward to its detachable mounting, said panels being movable on said mountings from said extended position to a substantially flush parallel position against said front face on each side of the grill, latching means on said front face on each side of said grill for detachably mounting said said other panel's other edge to said front face and for latching said panels in their flush position.

2. An air deflection apparatus for attachment to a truck having a substantially vertical flat front face with a radiator grill mounted centrally on the front face, a pair of vertically elongated front panels on each side of said radiator grill, each of said elongated panels being movably mounted to one another along one of their longitudinal edges and movably mounted along their other longitudinal edges to the front face whereby they may be moved to a forward extending position to extend forward from the grill on each side thereof to form separate vertical ridges along vertical axes where the two panels are movably mounted together with the panels diverging rearwardly therefrom and with one of the panels of each pair extending rearwardly and laterally outward from their vertical axis to provide a tapered surface and with its tapered surface providing reduced air resistance to the forward movement of the truck in comparison to the front face, and with the other of said panels on each respective side of the grill diverging rearward with its movable mounting on said front face being adjacent their respective outer edge of the grill.

3. An air deflection apparatus according to claim 2 wherein said panels are foldable from their extended position to a substantially flush parallel position on said front face, and said appratus includes latching means along said front face to latch said panels in either their extended or folded position.

* * * * *